Figure 1:
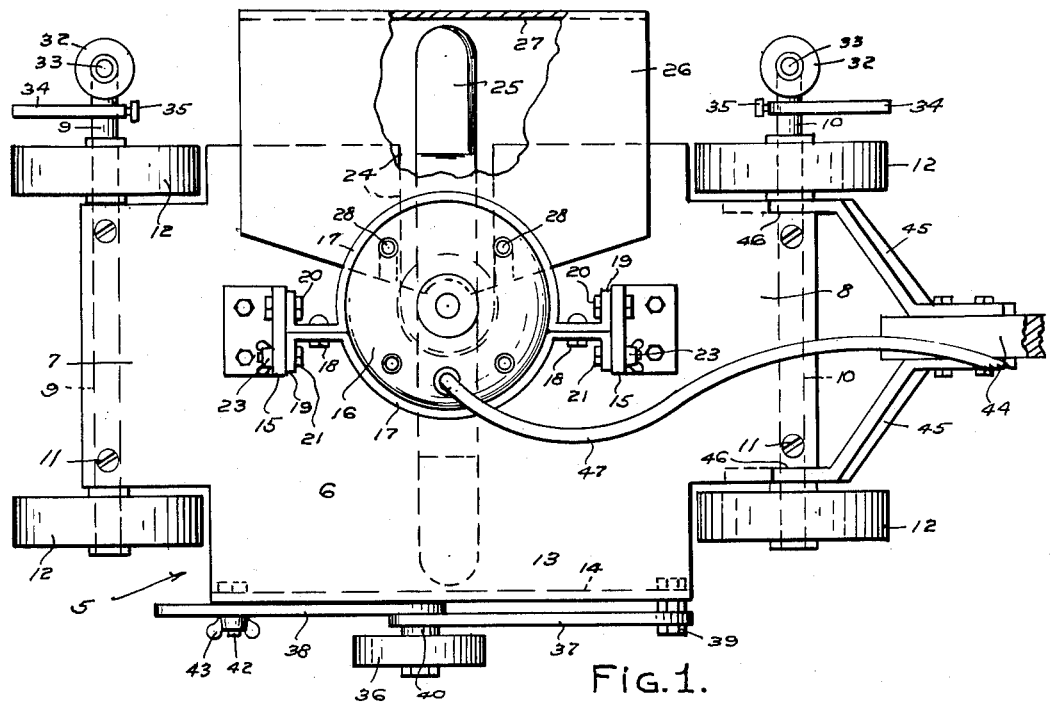

Feb. 14, 1956  G. T. LA BONTE  2,734,325
ROTARY LAWN MOWER AND EDGER
Filed Dec. 8, 1951  2 Sheets-Sheet 1

INVENTOR.
GEORGE T. LaBONTE,
BY
ATTORNEY.

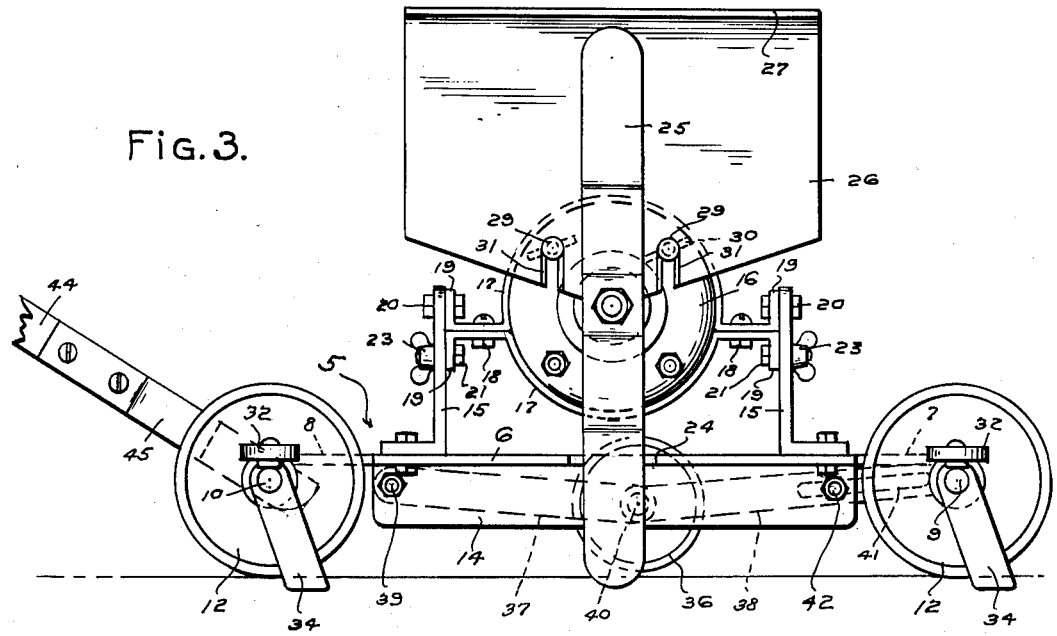
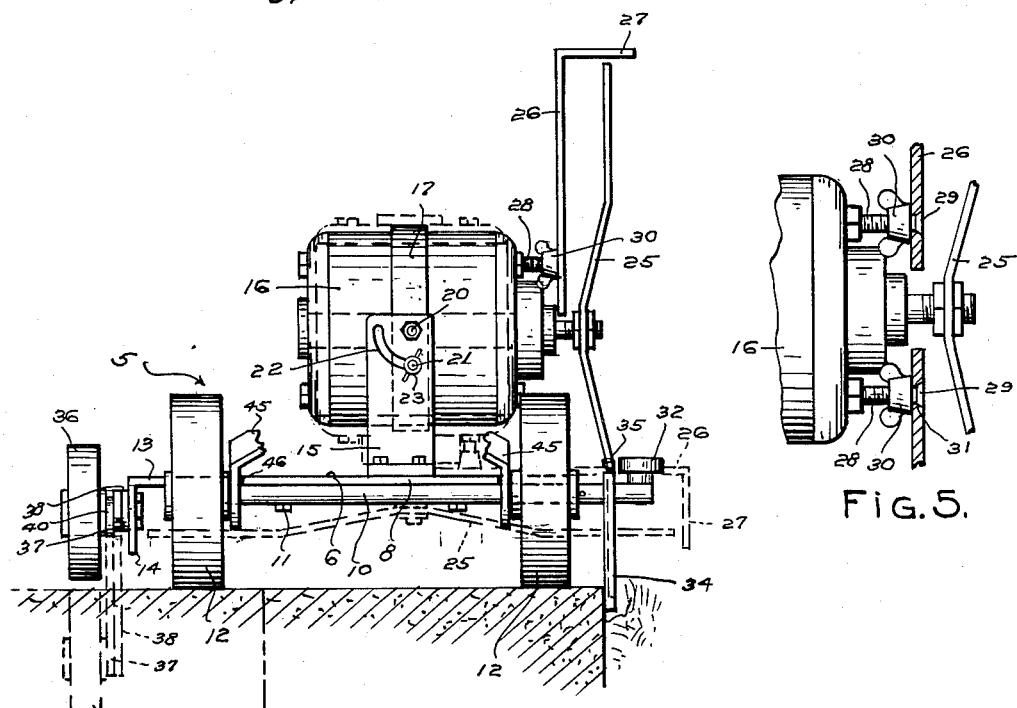

United States Patent Office 2,734,325
Patented Feb. 14, 1956

2,734,325

ROTARY LAWN MOWER AND EDGER

George T. La Bonte, Miami, Fla.

Application December 8, 1951, Serial No. 260,728

1 Claim. (Cl. 56—25.4)

This invention relates to improvements in a combined lawn mower and edging device.

It is an object of the present invention to provide a lawn mower of the rotary blade type, power driven from a prime mover with means provided whereby the prime mover and rotary blade may be arranged for a horizontal or vertical cutting action in a minimum of time.

A further object of the invention resides in novel guide means for trimming along sidewalks or curbstones with novel means for the horizontal support of the mower in cutting along curbstones where the mower would extend beyond the outer edge of the curbstone, to the end that the mower will be maintained in a correct horizontal position.

Another object of the invention resides in novel roller guides for accurately guiding the mower along vertical walls or the like to enable the cutting blade to trim relatively close to the wall without damage to the blade.

Another object of the invention resides in a novel mounting support for the prime mover and its supported cutting blade, through the medium of which the prime mover and blade can be quickly and easily swung in an arc of ninety degrees to dispose the cutting blade in a vertical cutting position, requiring no tools or other equipment for maintaining the prime mover and blade in such cutting position against accidental shifting movement.

Other novel features of construction and arrangement of parts co-operating to produce an effective combined lawn mower and trimming device will be readily apparent during the course of the following description, reference being had to the accompanying drawings wherein has been illustrated a preferred form of the device and wherein like characters of reference are employed to denote like parts throughout.

Figure 2:
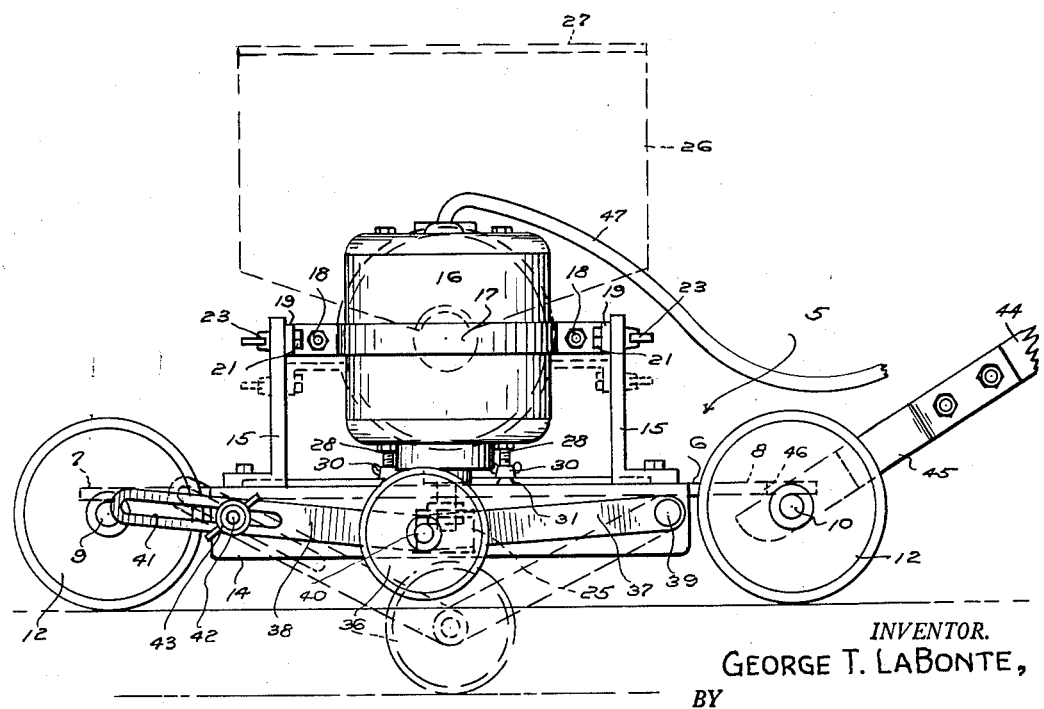

In the drawings:

Figure 1 is a fragmentary top plan view with parts broken away and shown in section of a lawn mower constructed in accordance with the invention, Figure 2 is a fragmentary side elevation of the mower with parts in the normal horizontal cutting position, Figure 3 is a side elevation of the device opposite to that shown in Figure 2, with the prime mover and cutting blade shifted to a vertical cutting position, Figure 4 is a rear end elevation of the mower, with the prime mover and cutting blade in the vertical cutting position and, Figure 5 is an enlarged fragmentary view with parts broken away and shown in section illustrating detachable connecting means for a guard plate.

Referring specifically to the drawings, the numeral 5 indicates the mower as a whole, embodying a preferably metallic platform 6, cut away at its front and rear to provide platform extensions 7 and 8. Axles, either square or round, indicated at 9 and 10, are bolted to the extensions 7 and 8, as at 11. The axles 9 and 10, rotatably support ground wheels 12, of any desirable construction and size. It will be observed, that the ground wheels 12 are positioned inwardly of the outer longitudinal edges of the platform 6. One side of the platform 6 is extended at 13 and is provided with a downwardly extended vertical flange 14, for its full length. The lower edge of the flange 14 terminates in spaced relation to the ground.

Rigidly fixed upon the platform, is a pair of spaced apart and vertically arranged bearing brackets 15. A prime mover, here indicated as an electric motor 16, is supported upon the brackets 15, through the medium of a pair of separable bands 17, connected in clamping engagement about the motor, by bolts 18. Each of the bands at their opposite ends are bent to provide oppositely extending and indentical legs 19, apertured adjacent their outer ends for the reception of bolts 20 and 21. The bolts 20 engage through suitable aligned openings formed in the brackets 15 at a predetermined elevation and serve to pivotally support the motor 16 to swing in a vertical plane. The bolts 21 engage through arcuate slots 22, formed in the brackets 15 and at their outer ends carrying wing nuts 23. The slots are one quarter circle and permit the shifting of the motor 16 from a vertical position through an arc of ninety degrees to be disposed upon a horizontal line. The platform 6 is slotted transversely at 24 from one side of the device to provide clearance for the vertical swinging of the motor 16 and its cutting blade, to be described. The motor 16 is provided with an extended shaft at its lower end that carries a double end cutting blade 25, connected with the shaft in any desirable manner against accidental displacement. The blade has a length that permits of its rotary cutting action inwardly of the flange 14, while its opposite extremity extends beyond the marginal edge of the platform 6, for a purpose to be described. A protective cover plate 26, having an outer depending flange 27, is adapted to be detachably connected with motor 16 to swing therewith. In the normal horizontal cutting position of the motor, the plate 26 engages upon the top surface of the platform. As a means for detachably supporting the plate 26, a pair of assembly bolts of the motor, indicated at 28, are extended downwardly and have their terminal ends flared at 29, shown best in Figure 5. The bolts 28 are threaded throughout their length and carry wing nuts 30. The flared ends 29 are engaged by bevelled wall slots 31, formed in the plate 26. When the plate is fully engaged with the bolts 28, the thumb nuts 30 are turned down to clamping engagement with the surface of the plate. Loosening of the nuts 30, permit the plate 26 to be withdrawn, for a purpose to be later described.

As clearly shown, the axles 10 and 9 are extended to the right of the device and have rotatably supported adjacent their outer ends, horizontally disposed guide rollers 32, carried upon stub-shafts 33. Inwardly of the stub-shafts and rollers 33 and 32, shiftable guide arms 34 have vertically shiftable rotary support upon the axles 10 and 9 that are held in adjusted position, by set screws 35. The guide arms 34, under normal lawn cutting action, are positioned in an upper inoperative plane. During the time the mower is employed for trimming along a sidewalk, the arms 34 are lowered and depend to a point where they slidably engage the vertical edge of the sidewalk, shown clearly in Figure 3.

At such times as it becomes necessary to trim the grass along the inner edge of curbstones, it will be found that the outer ground wheels 12, will be unsupported, see the dotted line showing in Figure 4. To provide for this contingency, an adjustable ground wheel 36 is provided as a means to support the outer side of the mower from the street level. The mounting for the wheel 36 consists of a pair of toggle arms 37 and 38. The arm 37 is pivotally supported upon a headed cylindrical shaft 39, fixed upon the flange 14 against displacement. The inner ends of the arms 37 and 38 overlap and jointly carry a stub-shaft 40, upon which the wheel 36 is freely rotatable. The arm 38 is slotted at 41 and slidably engages a fixed bolt 42, having a clamping wing nut 43. The wheel 36 in normal lawn cutting action, is elevated to the full line position shown in Figure 2, where it has full clearance with the lawn or other surface and is securely retained in such position by the clamping wing nut 43. When the mower is to be used to trim along the curbstone and the wheels 12 have no bearing surface, the nut 43 is loosened and, while the mower is held level, the wheel 36 is lowered to a point where it engages the street surface and the nut 43 reset. The mower may then be rolled along the curb line with its outer side continuously supported by the wheel 36.

Since the mower is manually propelled, a handle 44, of wood or metal, is supported in operative position upon the mower by a pair of oppositely arranged metallic bracket arms 45. Each arm 45 is apertured to have rotatable support upon the axle 10, inwardly of the rear ground wheels 12. The extension 8 is cut away upon opposite sides, as at 46, to a depth equal to the thickness of the terminal ends of the arms 45. The arms 45 extend beneath the extension 8 and bear against the lower surface of the extension to limit the downward swinging movement of the handle. When it becomes necessary for any reason to elevate the forward end of the mower, such as when changing the position of the motor and cutter blade, the operator bears down upon the handle 44, at which time the lower terminal ends of the bracket arms 45 bear against the extension 8, causing the mower to rock upward upon the rear ground wheels 12. Any suitable electrical conductor 47 of a flexible nature, leads from a source of electrical energy and a manually controlled handle switch, not shown, serves to energize the motor. The switch obviously may be of any desired type, such for instance of a type that will interrupt the current to the motor when released by the operator.

In use, for normal lawn cutting, the motor and associated parts are arranged in the manner shown in Figures 1 and 2. The protective plate 26 overlies the rotary cutting blade 25 and prevents damage or accident to the operator and further prevents the blade from being damaged by striking obstructions, such as corners of buildings or the like. When it is desired to trim close to a vertical wall, the nuts 30 are loosened and the plate 26 removed. At this time, the cutting end of the blade 25 is exposed beyond the right marginal side of the platform 6. The operator then guides the mower along the wall with the rollers 32 in contact therewith. The rollers 32 are set outwardly a slight distance beyond the terminal ends of the blade 25 and permit the blade to cut close to the wall without danger of the blade striking the wall and being damaged. After the edging along the walls has been completed, the plate 26 is replaced and clamped in position. Assuming now, that it is desired to trim along a sidewalk, the operator loosens the nuts 23 and then bearing down on the handle 44, elevates the forward end of the mower, at which time the motor and cutting blade are swung to a vertical cutting position, shown in Figures 3 and 4 and the nuts 23 again set in clamping position. The cutter blade 25 will then cut in a vertical plane. The operator then lowers the arms 34 to a point where they depend below the surface of the sidewalk and, arranging the mower with both arms 34 bearing against the walk, energizes the motor and pushes the mower along the walk, keeping both arms 34 in engagement with the walk. The arms 34 prevent the cutting blade from striking the walk and assures of an even straight trimming of the grass. As before stated, when it becomes necessary to trim the grass along the inner side of the curbstone, the wheel 36 is lowered until it contacts the street surface and the mower arranged in cutting position with the arms 34 bearing against the inner side of the curbstone. The trimming is performed in the same manner as in trimming along the sidewalks. After the trimming has been completed, the wheel 36 is again elevated to inactive position, the arms 34 are swung to inactive position and the motor and blade 16 and 25 are swung to normal vertical position and clamped by the nuts 23. The mower may then be rolled to a place of storage.

It will be clearly apparent, that a very simple and highly efficient mower has been provided. The mower, with simple adjustments, performs both the lawn cutting and the trimming with a single machine. Heretofore, separate machines have been employed for the lawn cutting and trimming. The parts are few and simple and lend themselves to economical manufacturing costs. The novel mounting support for the motor permits of the change-over from a lawn mower to a trimming machine in a minimum of time and will rigidly support the motor and cutting blade in either of the two cutting positions. The novel guide means embodying the rollers 32 and arms 34, assures of an accurate trimming of the grass along the walls, sidewalks and curbstones with the cutter blade being protected at all times.

It is to be understood, that while a preferred form of the machine has been illustrated, various changes in the shape, size and arrangement of parts may be resorted to as readily fall within the spirit of the invention or the scope of the subjoined claim.

Having described my invention, what I claim as new and desire to secure by Letters Patent is:

A combined lawn mower and edging device of the rotary cutting blade type, comprising a generally square flat platform having front and rear extensions, axles bolted to the underside of each extension adjacent its outer end, ground wheels rotatably supported upon the axles at the right and left side of the platform, the ground wheels upon the right side being flush with the right marginal edge of the platform, the platform at its left side provided with a depending flange, the axles at the right side of the device being extended beyond the ground wheels, guide rollers rotatably supported at the outer ends of the extended axles, to rotate in a horizontal plane, the rollers being of identical diameter and positioned at an identical distance from the right edge of the platform, a handle for the mower that is carried by a pair of divergent bracket arms, the bracket arms being pivotally supported on the rear axle, the rear platform extension being notched at either side to a depth corresponding to the thickness of the bracket arms, the bracket arms pivotally supported on the axle to engage within the notches with their terminal ends underlying the platform extension and contacting therewith to limit the downward angularity of the handle, a pair of spaced apart and parallel upstanding brackets rigidly bolted to the platform intermediate its length, an electric motor that is embraced by a pair of identical clamping bands having out turned parallel legs at diametrically opposite sides of the motor, one leg at each side of the motor being pivotally supported on the brackets through the medium of which the motor may be swung in a vertical plane from a vertical to a horizontal position, each of the brackets being provided with an arcuate slot, a bolt carried by the other legs at each side of the motor for sliding engagement in the slots, a wing nut threaded upon each of the bolts for clamping the motor in each position of adjustment, the platform provided with a transverse slot opening through the right side of the platform, a drive shaft projecting from the motor to extend through the slot to a point below the platform when the motor is vertically arranged, a double end cutting blade supported upon the shaft below the platform, the cutting blade when rotating in a horizontal plane having an arc that extends beyond the right side of the platform, a cover plate detachably connected with the motor for overlying the path of rotation of the cutting blade and with the cover plate being shiftable with the motor, the cover plate having an overlying engagement with the surface of the platform when the motor is vertically arranged, the motor when horizontally arranged serving to position the cutting blade outwardly of the right side of the platform to rotate in a vertical arc, the said rollers serving to guide the platform in parallel relation to a wall area when the cutting blade is positioned in a horizontal cutting plane and whereby to maintain the cutting blade free from contacting engagement with the wall area.

References Cited in the file of this patent

UNITED STATES PATENTS

| | | |
|---|---|---|
| Re. 21,274 | Orr | Nov. 21, 1939 |
| 1,447,881 | Nielsen | Mar. 6, 1923 |
| 1,551,647 | Dyson | Sept. 1, 1925 |
| 2,554,805 | Barton | May 29, 1951 |
| 2,556,790 | Berdan | June 12, 1951 |
| 2,574,725 | Berdan | Nov. 13, 1951 |